US006670586B2

(12) United States Patent
Ingemanson et al.

(10) Patent No.: US 6,670,586 B2
(45) Date of Patent: Dec. 30, 2003

(54) INFRARED OVEN

(75) Inventors: Mats O. Ingemanson, New York, NY (US); Robert H. LaPrad, deceased, late of Seaford, DE (US), by Phillip T. LaPrad, legal representative

(73) Assignee: Redi-Kwik Corp., Seaford, DE (US)

( * ) Notice: Subject to any disclaimer, the term of this patent is extended or adjusted under 35 U.S.C. 154(b) by 0 days.

(21) Appl. No.: 10/099,147

(22) Filed: Mar. 15, 2002

(65) Prior Publication Data

US 2003/0121904 A1 Jul. 3, 2003

Related U.S. Application Data

(60) Provisional application No. 60/276,556, filed on Mar. 16, 2001.

(51) Int. Cl.[7] .......................... F27D 11/02; A21B 1/22; A21B 1/40

(52) U.S. Cl. ........................ 219/492; 219/411; 219/413

(58) Field of Search ......................... 219/411–413, 391, 219/492, 685, 680

(56) References Cited

U.S. PATENT DOCUMENTS

| | | | | |
|---|---|---|---|---|
| 4,238,995 A | * 12/1980 | Polster | 219/411 |
| 4,421,015 A | 12/1983 | Masters et al. | |
| 4,960,977 A | * 10/1990 | Alden | 219/411 |
| 5,036,179 A | 7/1991 | Westerberg et al. | |
| 5,378,872 A | * 1/1995 | Jovanovic | 219/411 |
| 5,382,441 A | 1/1995 | Lentz et al. | |
| 5,472,720 A | 12/1995 | Rakhimov et al. | |
| 5,484,618 A | 1/1996 | Barz et al. | |
| 5,517,005 A | 5/1996 | Westerberg et al. | |
| 5,695,669 A | 12/1997 | Westerberg | |
| 5,712,464 A | 1/1998 | Westerberg | |
| 5,726,423 A | 3/1998 | Westerberg et al. | |
| 5,954,980 A | 9/1999 | Westerberg et al. | |
| 6,013,900 A | 1/2000 | Westerberg et al. | |
| 6,069,345 A | 5/2000 | Westerberg | |
| 6,139,885 A | 10/2000 | Jouaneut et al. | |

* cited by examiner

*Primary Examiner*—Joseph Pelham
(74) *Attorney, Agent, or Firm*—Law Office of John A. Parrish

(57) ABSTRACT

The disclosed invention relates to an oven for cooking foodstuffs such as pizza by infrared radiation. The oven includes nichrome-quartz heating elements which are governed by a pulse type controller. The pulse type controller cause the heating elements to generate infrared radiation over selected time periods to efficiently cook a foodstuff.

5 Claims, 7 Drawing Sheets

FIG. 2
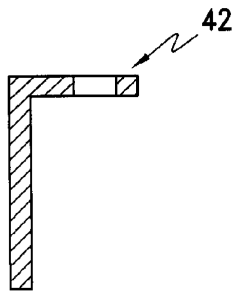
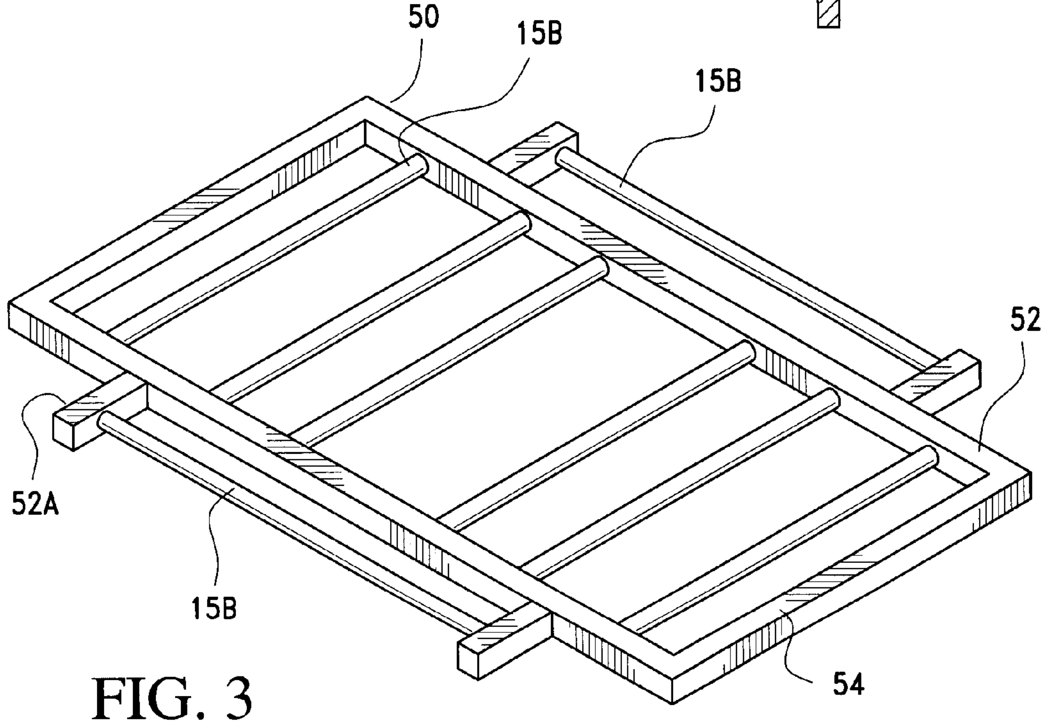
FIG. 3
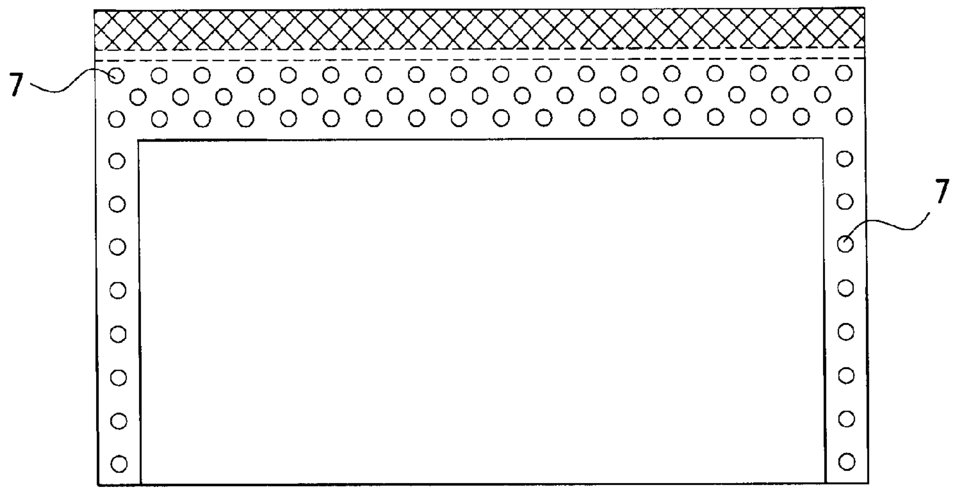
FIG. 4

INFRARED OVEN

FIELD OF THE INVENTION

The invention relates to the field of radiant energy ovens. More particularly, the invention relates to radiant energy ovens which employ heating elements for generation of infrared radiation.

BACKGROUND OF THE INVENTION

Most pizza restaurants use deck pizza ovens which must remain on 24 hours per day, 7 days per week. Some restaurants use convection conveyer belt pizza ovens which remain on only during the hours of operation of the restaurant. Convection conveyer belt pizza ovens, however, are more expensive to purchase than conduction deck ovens and consume more energy per hour of operation than conduction deck ovens.

Microwave ovens also have been employed to cook pizza. Microwave ovens, however, cannot be used to cook high quality pizza. Microwave ovens are employed to cook commercially available frozen pizzas. The resultant microwave cooked pizza is usually unsatisfactory.

Higher quality pizza can be baked in a conduction/convection oven. In this instance, the pizza is placed directly on the hot floor of the oven to crisp the bottom of the crust. Conduction/convection ovens, however, have "hot" spots and require constant operator attention to avoid over or under cooking of the pizza. Consistency therefore is a major problem. Moreover, conduction/convection ovens can require up to 20 minutes to cook a pizza.

In cooking and serving of pizza, energy and equipment costs have risen and have become an increasing economic burden on restaurants. In addition, productivity requirements for ovens continue to increase since restaurants desire to bake and serve pizza in the shortest possible time.

A need therefore exists for an oven which overcomes the time and energy disadvantages of the prior art ovens.

DESCRIPTION OF THE DRAWINGS

FIG. 2 is a cross sectional view of support bracket.

FIG. 3 is an isometric view of a framework assembly having heating elements therein.

FIG. 4 is a rear view of an oven according to the present invention.

SUMMARY OF THE INVENTION

Figure 1A:
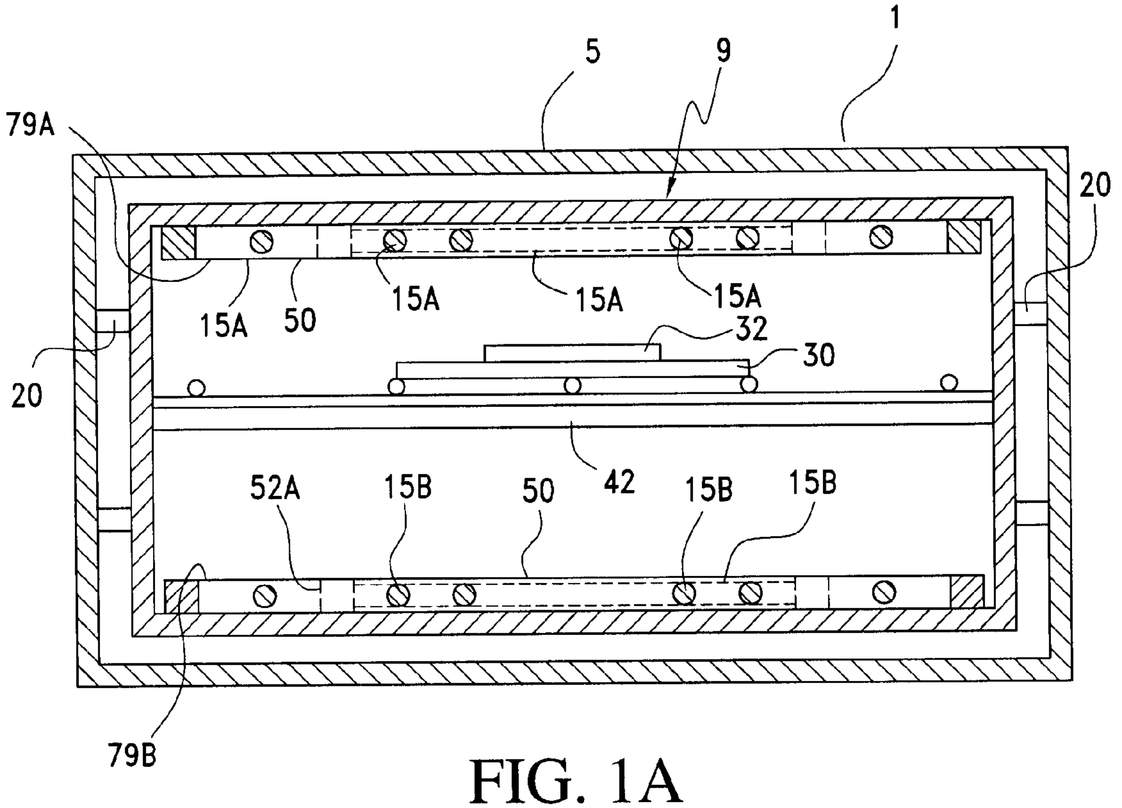
FIG. 1A is a cross sectional view taken along section AA of FIG. 1.
Figure 1:
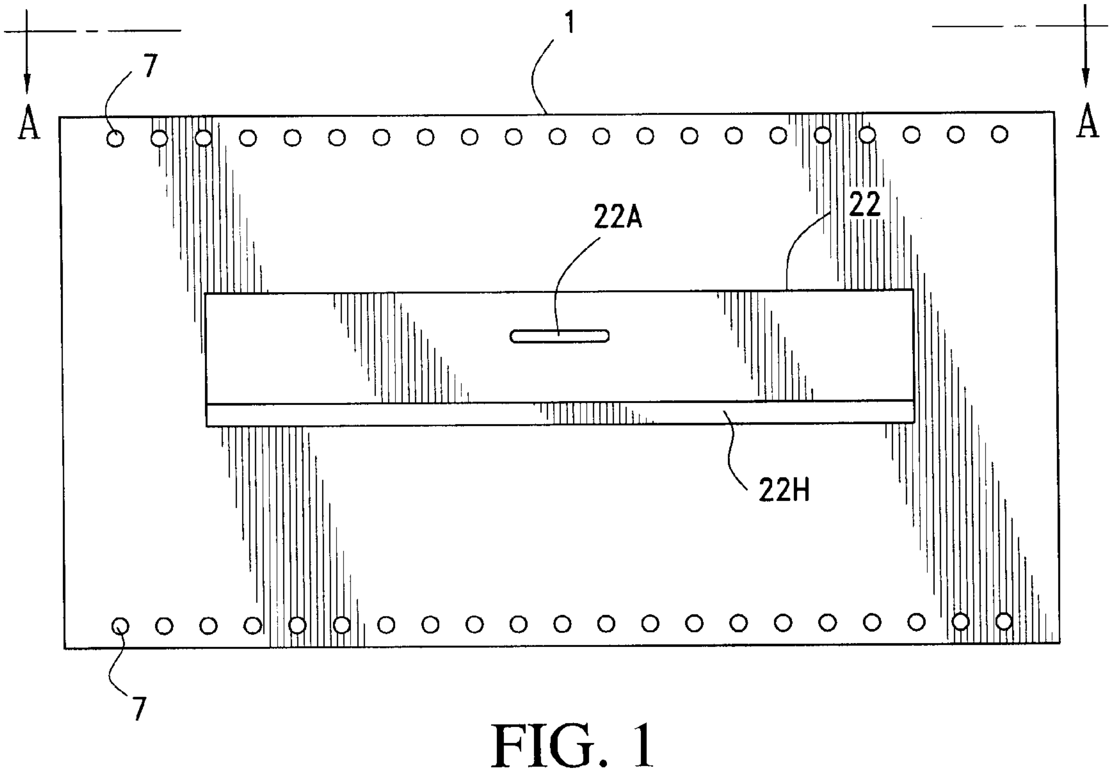
FIG. 1 is a front view of an oven according to an embodiment of the present invention.

The disclosed invention relates to an oven for cooking foodstuffs such as pizza by infrared radiation. The oven includes Nichrome-quartz heating elements which are governed by a pulse type controller. The pulse type controller cause the heating elements to generate infrared radiation over selected time periods to efficiently cook a foodstuff.

The oven of the invention enables pizza and other food products to be cooked consistently to a desired state regardless of the initial temperature of the oven or fluctuations in line voltage.

The oven includes a Nichrome-quartz heating element that operates at 220 V to 250V and which has a power rating of 1300 W, and a controller for supplying intermittent pulses of electrical energy to the heating element to cause the heating generate infrared energy of a wavelength of about 5.3 micron to about 9.1 micron. The controller supplies intermittent pulses of electrical energy which have a duration of about 0.5 to 2 sec., and at one sec. intervals between pulses. In another aspect, the oven includes a sensor for sensing a temperature of the heating element and for forwarding that temperature to the controller. The controller supplies intermittent pulses of electrical energy to the heating element to cause the heating element to operate at about 47° C. to about 271 ° C.

DETAILED DESCRIPTION OF THE INVENTION

The present invention provides an oven especially adapted for cooking foodstuffs such as pizza. The oven employs heating elements which generate infrared energy of a selected range of wavelengths of about 2.8 microns to about 9.1 microns, preferably about 5.0 microns to about 5.8 microns, to cook foodstuffs such as pizza as well as to kill pathogens such as E-coli and Salmonella.

In a first embodiment, oven 1, as shown in FIGS. 1–4, includes inner chamber 9 positioned within outer body 5. Inner chamber 9 can be maintained in spaced relationship to outer body 5 by supports 20. Outer body 5 includes hinged door 22 to permit access to inner chamber 9. Door 22 may be solid or have a glass section to enable viewing of pizza 32 in inner chamber 9 while it is being treated with infrared radiation. Outer body 5 has openings 7 on the front and rear surfaces thereof to permit ambient air to flow into inner chamber 9 as well as to permit hot air to flow from chamber 9 to leave oven 1. Chamber 9, as well as interior surface of door 22 may be formed of a reflective material such as aluminum or stainless steel, preferably aluminum.

Inner chamber 9 includes elongated support brackets 42 for receiving a plurality of support rods 11 thereon. Support brackets 42 can have a "L" shaped configuration as shown in FIG. 2. Support rods 11 can be placed on support brackets 42 at a desired position within inner chamber 9 to support platter 30 that receives pizza 32 thereon. Platter 30 can be a standard wire mesh grid tray such as Pizza Screen from American Metal Craft. The rear wall of inner chamber 9 can have openings located along the bottom portion thereof to enable ambient air to flow into inner chamber 9.

Support rods 11 can be positioned at a desired distance between heating elements 15A,15B within inner chamber 9 to enable pizza 32 on platter 30 to be exposed to a desired intensity of infrared radiation. Typically, support rods 11 are located about 3–7 inches, preferably about 5 inches, from upper heating elements 15A and about 3–7 inches, preferably about 5 inches, from lower heating elements 15B.

Upper and lower heating elements 15A,15B, as shown in FIG. 3, can be placed into an array and be maintained in a desired relationship to each other by framework 50. Framework 50 can be constructed from metals such as aluminum. Framework 50 includes elongated members 52 and end members 54. Elongated members 52 include lateral extending sections 52A. For purposes of illustration, and without limitation, FIG. 3 shows a framework 50 which includes heating elements 15B. It is to be understood, however, that framework 50 can be employed with heating elements 15A. Framework 50 having heating elements 15A,15B, can be secured to the interior of chamber 9 by conventional fasteners such as screws (not shown).

Heating elements 15A,15B preferably are Nichrome-quartz heating elements which include a Nichrome wire housed in a sealed quartz tube. The Nichrome-quartz heating elements which may be employed have a power rating of about 400 watts to about 1600watts, and can generate infrared radiation at an intensity of about 10 $KW/m^2$ to about 20$KW/m^2$ over a wavelength range of about 5.3 microns to about 9.1 microns. Heating elements 15A,15B receive power through leads connected to temperature controller 88. Preferably, temperature controller 88 is a pulse type controller which varies the voltage and duration of electrical pulses to the heating elements.

Heating elements which may be used include Nichrome-quartz heating elements such as models QIM 165 and QIM 166 from Thermo Innovations Corp, Manasquan, N.J. 08736. Model QIM 165 heating element operates at 220 V and has a power rating of 1300 W. Model QIM 166 heating element operates at 250 V and has a power rating of 1300W. These heating elements can be operated at about 47° C. to about 271° C. and generate infrared radiation over a wavelength range of about 5.3 to about 9.1 microns.

In a first aspect of the first embodiment of oven 1, as shown in FIG. 1A an upper array 79A of heating elements 15A and a lower array 79B of heating elements 15B are employed. The number of heating elements may vary in each of the upper and lower arrays. Typically, an array includes two to ten, preferably three heating elements.

Heating elements 15A,15B in each array can be placed in a symmetrical or asymmetrical arrangement with respect to the axis of symmetry of that array. By selecting a lateral spacing between adjacent heating elements 15A,15B as well as the distance between elements 15A,15B from pizza 32, an evenly distributed infrared energy field is created to cook uniformly and quickly foodstuffs such as pizza 32.

Figure 5:
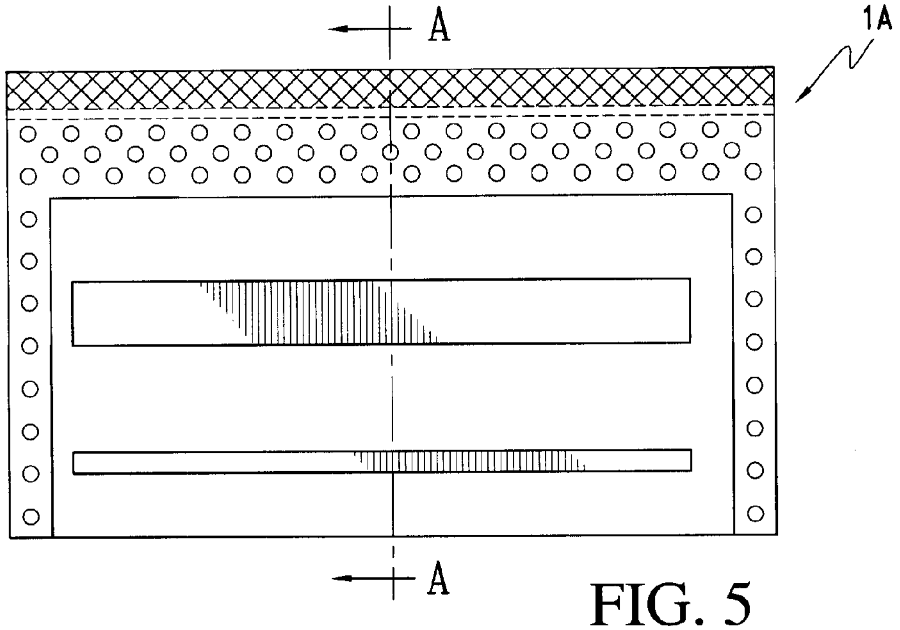
FIG. 5 is a front view of another embodiment of the oven of the invention.
Figure 6A:
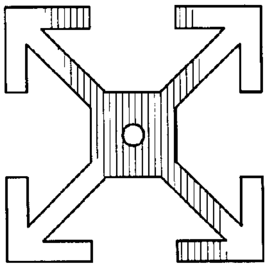
FIG. 6A is a cross section view of a frame member for use in construction of the oven.
Figure 6:
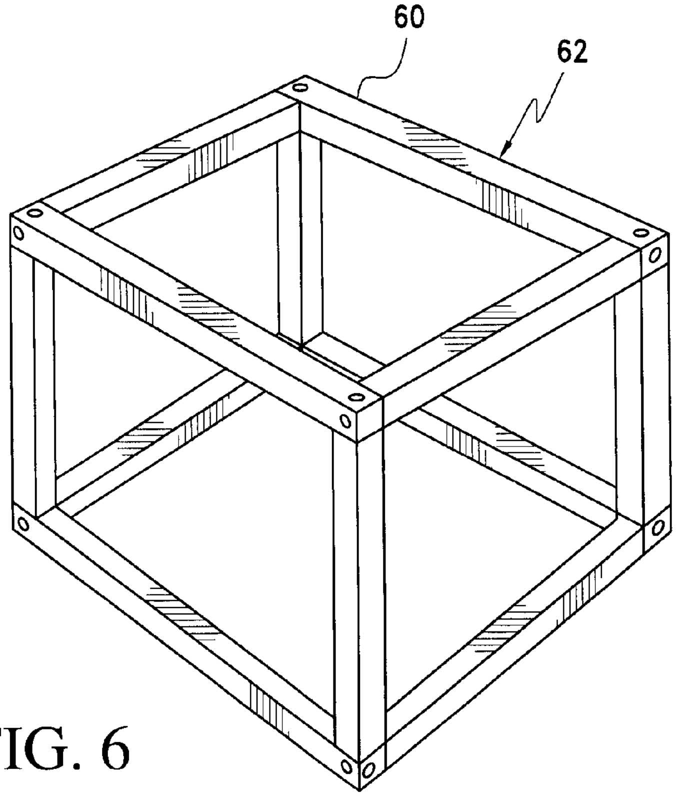
FIG. 6 is an isometric view of a box frame used in construction on an embodiment of the oven of the invention.
Figure 5A:
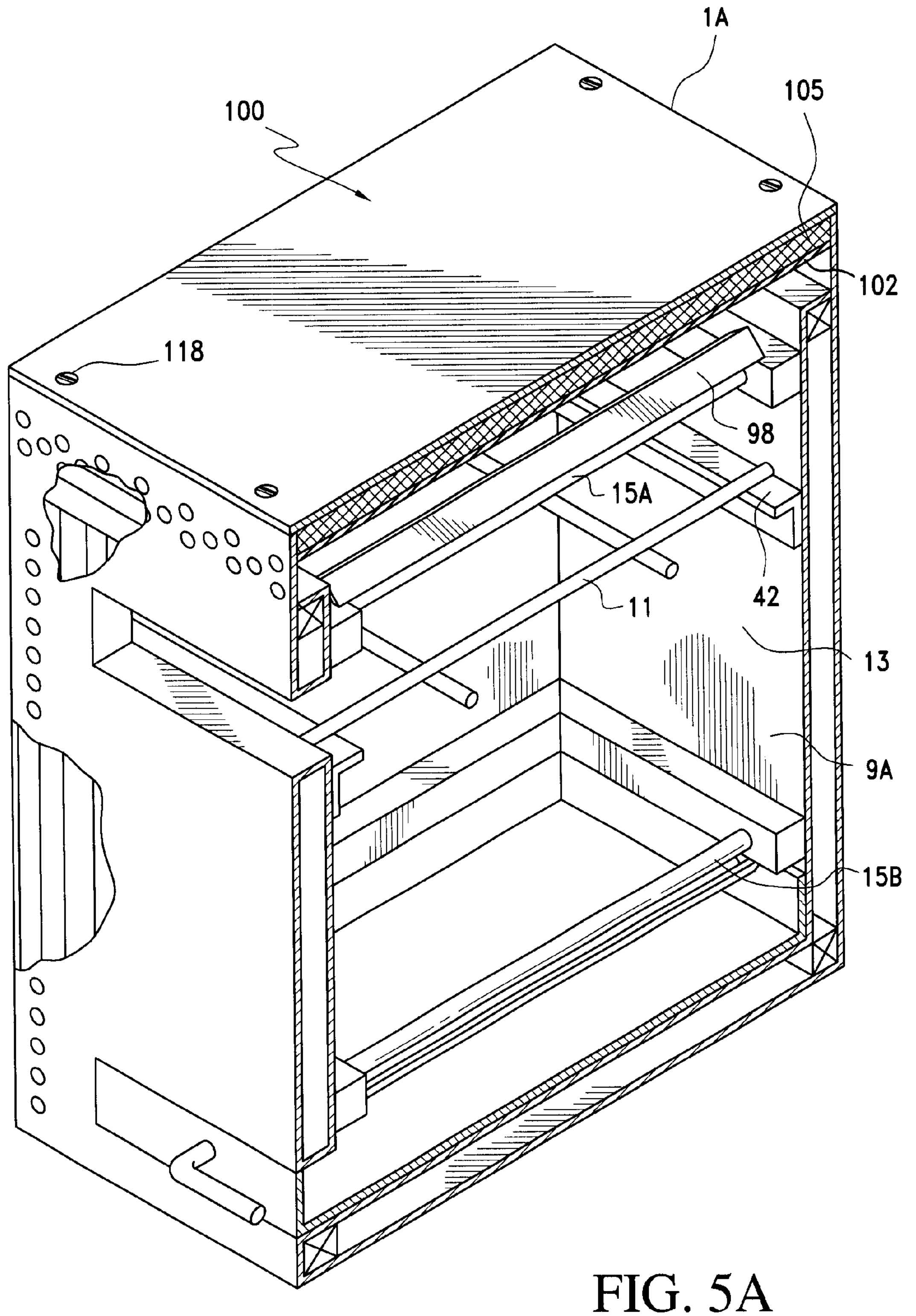
FIG. 5A is a cross section of the oven of FIG. 5 taken on line A-A.
Figure 7:
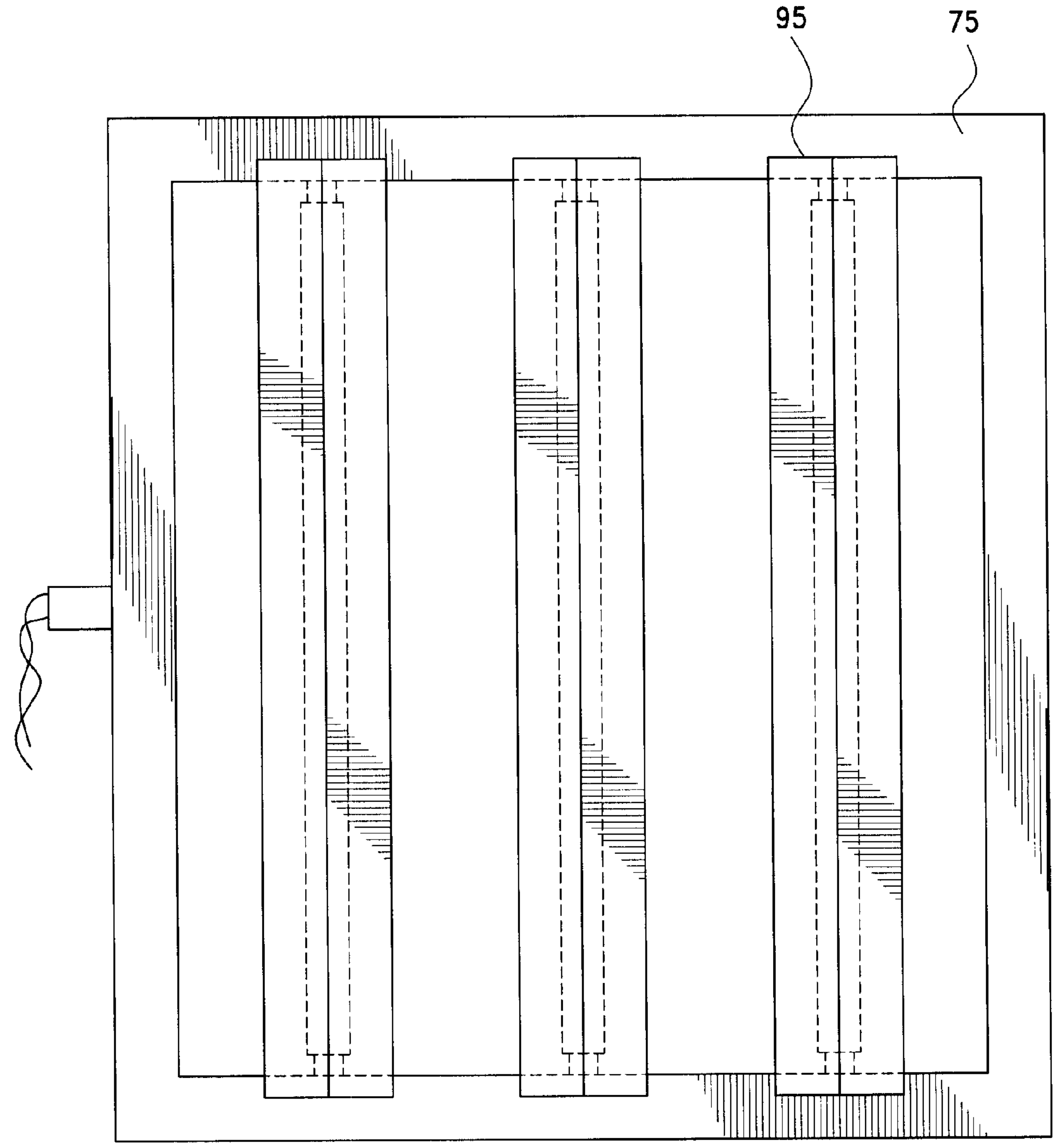
FIGS. 7 and 7A are top and side views of an upper suffrage which includes electrical heating elements and a reflector.
Figure 7A:
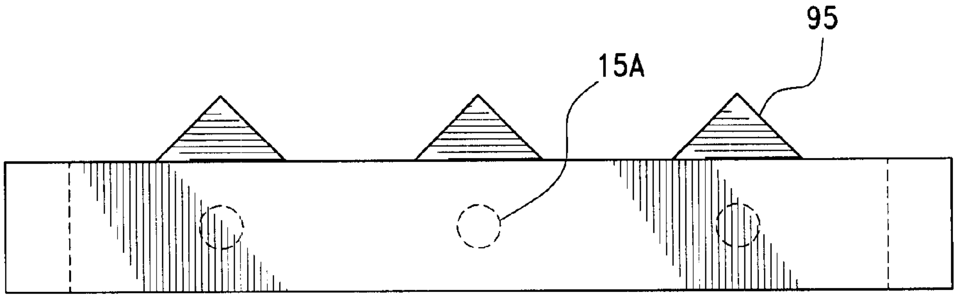
Figure 8:
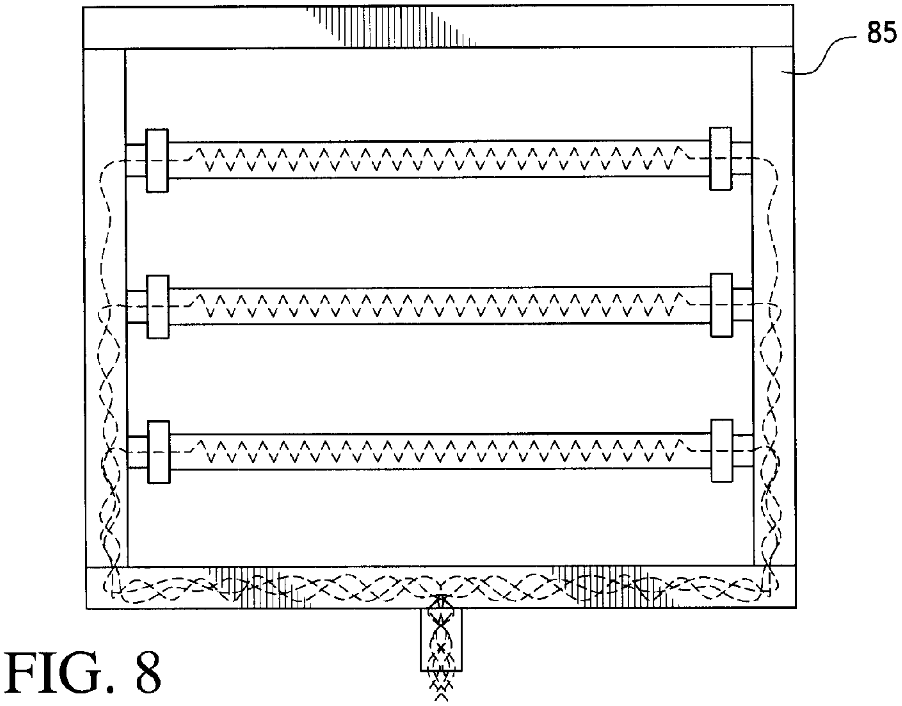
FIGS. 8 and 8A are top and end views, respectively, of a lower suffrage which includes electrical heating elements.
Figure 8A:
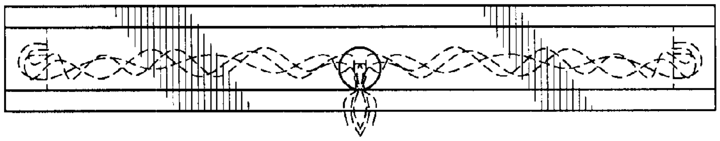

In a second embodiment of the invention, oven 1A, as shown in FIGS. 5–10, includes hollow frame members 60 assembled to form box frame 62 as shown in FIG. 6. Frame members 60 preferably have a cross section as shown in FIG. 6A. Highly reflective metal sheets such as aluminum are attached to box frame 62 to yield a chamber that has rear, bottom and side walls. Heating elements 15A together with concave reflectors 95 are assembled onto upper subframe 75 as shown in FIGS. 7 and 7A. Upper subframe 75 is assembled from frame members 60 such as those used to form box frame 62. Heating elements 15A are secured to upper subframe 75, and concave reflectors 95 are secured to upper subframe 75 over heating elements 15A. Electrical leads are passed through frame members 60 of upper subframe 75 for attachment to heating elements 15A. Concave reflectors 95 extend along a desired length of the heating element, preferably the entire length of the heating element. Lower subframe 85, as shown in FIGS. 8 and 8A, is made similarly to upper subframe 75 except that no reflectors are attached to lower subframe 85.

The upper and lower subframes having the heating elements therein are attached to the side walls of chamber 9 by fasteners (not shown). Useful fasteners include screws, pins and the like.

Figure 9:
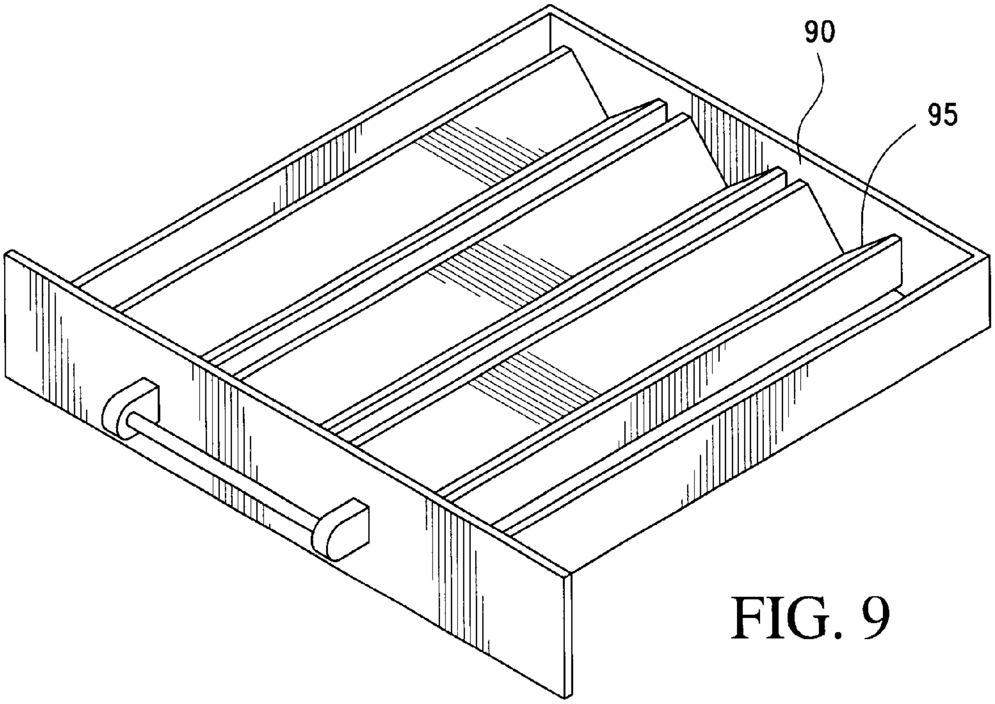
FIG. 9 is an isometric view of a crumb tray with an integral reflector.
Figure 10:
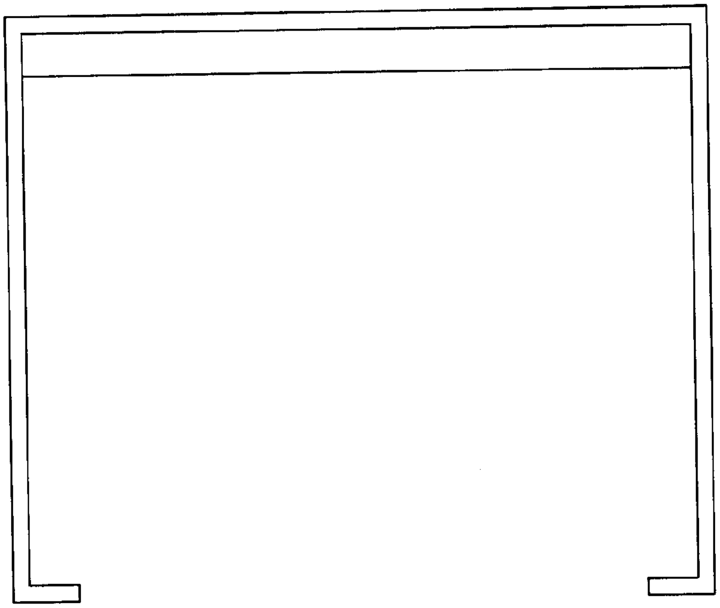
FIGS. 10 and 10A are front and side views, respectively, of an outer shell used in construction on an embodiment of the oven of the invention.
Figure 10A:
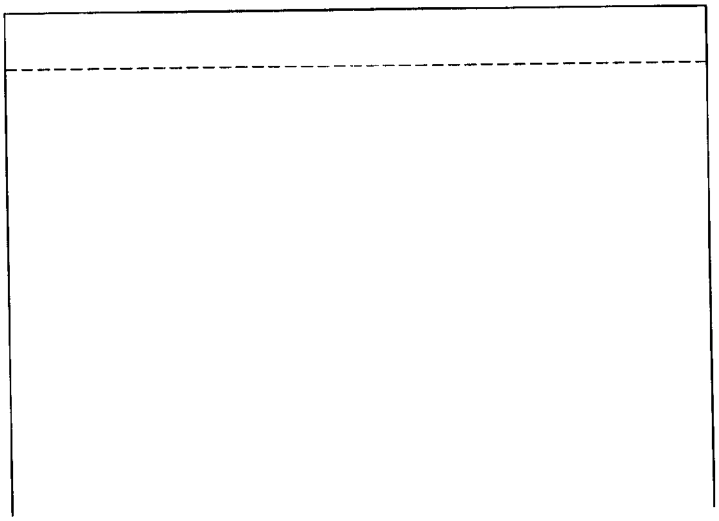
Figure 11:
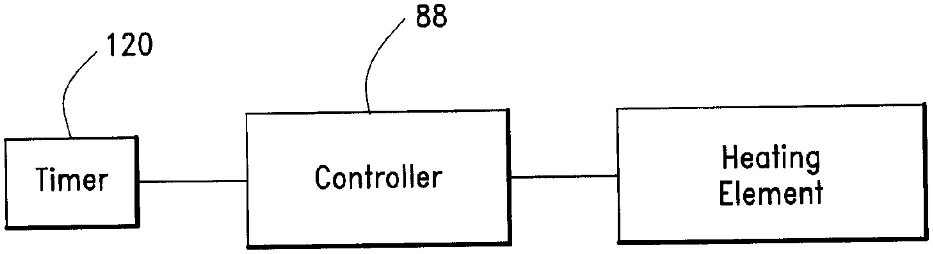
FIG. 11 is a schematic of the operation configure of timer, controller and heating elements.

Crumb tray 90, preferably having reflectors 95 which have a concave curvature, as shown in FIG. 9, is positioned below lower subframe 85 so that tray 90 and reflectors 95 are below heating elements 15B. Crumb tray 90 can slide into an opening provided below the bottom surface of lower subframe 85 as shown in FIG. 5. An outer shell 100 of reflective metal as shown in FIG. 10 then is attached over box frame 62 by fasteners 118. Useful fasteners include screws, pins and the like. A layer of insulation 105 such as fiberglass is secured to the interior surface of outer shell 100 in insulation shelf 102 of outer shell 100 as shown in FIGS. 10 and 10A.

As in the first embodiment, in this second embodiment of the oven of the invention, inner chamber 9A includes elongated support brackets 42 for receiving a plurality of support rods 11 thereon. The rear wall 13 of inner chamber 9A can have holes located along the bottom portion thereof to enable air to flow into chamber 9A. Support brackets 42 can have a "L" shaped configuration as shown in FIG. 2. Support rods 11 can be placed on support brackets 42 at a desired position within chamber 9. Support rods 11 function to support platter 30 that has a foodstuff such as a pizza thereon. Support rods 11 can be positioned at a desired distance between heating elements 15A, 15B within chamber 9A to enable the pizza to be exposed to a desired intensity of infrared radiation. Typically, support rods 11 are located about 3–7 inches, preferably about 5 inches, from the upper heating elements and about 3–7 inches, preferably about 5 inches, from the lower heating elements.

In this second embodiment, the heating elements also are Nichrome-quartz heating elements which include a Nichrome wire housed in a sealed quartz tube. The heating elements typically have a power rating of about 400 watts to about 1600 watts and generate infrared radiation at an intensity of about 7 $KW/m^2$ to about 31 $KW/m^2$. Preferably, the heating elements are QIM-166 heating elements from Thermo Innovations Corp. Heating elements 15A, 15B receive power through leads connected to temperature controller 88.

Temperature controller 88 enables regulation of the temperature of the heating elements and the consequent wavelength and intensity of infrared radiation received by the pizza. Controller 88 preferably enables upper heating elements 15A to operate at the same or different temperature from lower heating elements 15B. Controller 88 can manually be set to a desired pulse mode setting to control the electrical power to the heating elements.

Useful temperature-process controllers include Model CN 4321TR-D1 From Omega Corp., as well as Infinite Control Mechanism models CH-152 or CH-252 from Omega Engineering Corp., Stamford, Conn.

Controller 88 is activated for a desired cooking cycle by a digital or analog timer 120 that is electrically connected to the controller 88. Useful timers include Handset Interval Timer INM from Precision Timer Co, Inc., Westbrook, Conn. and PTC-21 Series 1/16 DIN Multi-Programmable Dual Display Timers from OMEGA Engineering Corp, Stamford, Connecticut. When the cooking cycle is complete, the timer shuts off to deactivate the controller.

Operation

During operation of each embodiment of oven 1 to cook a foodstuff such as pizza 32, platter 30 having pizza 32 thereon is first placed on support rods 11 at a desired distance from each of heating elements 15A,15B within inner chamber 9. Platter 30 can be a standard grid tray such as Pizza Screen from American Metal Craft. Heating elements 15A,15B are placed both above and below pizza 32 to expose pizza 32 to the infrared radiation generated by the heating elements. Upper heating elements 15A may be operated at the same or different power levels from lower heating elements 15B.

In a first aspect of this second embodiment, a sensor and a temperature-process controller are used to control electrical energy supplied to the heating elements. A useful sensor is Model no. TJ 36-CASS-14U-12 from Omega Corp., Stamford, Conn. The sensor is placed in contact with the glass tube component of a heating element. The sensor senses the temperature of the glass tube and forwards it to the controller. A useful controller is a maintenance pulse type controller such as Model CN 4321 TR-D1 from Omega Corp. The controller is preset to a desired value to control the electrical energy sent to the heating elements. The controller preferably enables each of the heating elements to receive about equal amounts of electrical energy so that all of the heating elements can operate at about the same temperature. When the temperature of the heating elements is about equal to the preset temperature of the controller, the controller adjusts the electrical energy supplied to the heating elements from continuous to pulsating. The electrical pulsations from the controller enables control of the temperature of the heating elements and the consequent wavelength and intensity of the infrared radiation received by the pizza.

The time-temperature behavior of a QIM-165 heating element when energized by Model CN 4321 TR-D1 controller that is preset to achieve an operating temperature of 260° C. in the heating element is shown in Table 1.

TABLE 1

Time to Temperature at Controller Preset Temperature of 260° C.

| Time (sec) | Temperature ° C. of Heating Element | Wavelength (microns)[1] |
|---|---|---|
| 0 | 47 | 9.1 |
| 30 | 59 | 8.7 |
| 60 | 115 | 7.5 |
| 90 | 162 | 6.7 |
| 120 | 197 | 6.2 |
| 150 | 220 | 5.9 |
| 180 | 240 | 5.6 |
| 210 | 252 | 5.5 |
| 240 | 262 | 5.4 |
| 270 | 268 | 5.4 |
| 294 | 271 | 5.3 |

[1]Wavelength of infrared radiation calculated from Wien's law

Table 2 shows the time-temperature behavior of a QIM-165heating element when energized by Model CN 4321 TR-D1 controller is preset to achieve an operating temperature of 275° C.

TABLE 2

Time to Temperature at Controller Preset Temperature of 275° C.

| Time (sec) | Temperature ° C. of Heating Element | Wavelength (microns)[1] |
|---|---|---|
| 0 | 41 | 9.2 |
| 30 | 62 | 8.7 |
| 60 | 112 | 7.5 |
| 90 | 167 | 6.6 |
| 120 | 205 | 6.1 |
| 150 | 233 | 5.7 |
| 180 | 254 | 5.5 |
| 210 | 268 | 5.4 |

[1]Wavelength of infrared radiation calculated from Wien's law

In a second aspect of the operation of this second embodiment of the oven, each of the upper and lower heating elements 15A,15B is a QIM-166 heating element from Thermo Innovations Corp. Each of the heating elements has a concave reflector 95 associated therewith. The heating elements are energized by a pulse type temperature-process controller such as any of Infinite Control Mechanism models CH-152 or CH-252 from Omega Corp. The controller is set to a desired value to control electrical power to the heating elements. The controller enables upper heating elements 15A to operate at the same or different temperature from lower heating elements 15B. This aspect of the opertion of the oven further is illustrated below in non-limiting Examples 1–14.

Examples 1–14:

In examples 1–14 below, an upper array of three heating elements and a lower array of three heating elements are employed. The heating elements in each array are the Thermo Innovations Corp. QIM-166 heating elements described above. A concave reflector is employed with each of the heating elements in both the upper and lower arrays. The controller employed for providing electrical power to the heating elements is a CH-252 controller from Omega Engineering Corp. The CH-252 controller has a maximum power rating of 3600 watts and operates at 240 Volts. The pizza is located 5 inches from each of the upper and lower arrays of heating elements.

The CH-252 controller is activated by a timer to provide pulses of electrical energy at 240 V to each of the heating elements. The length of the pulses and the time periods between pulses depends on the preset mode values which can be manually applied to the controller dials. The preset mode values, together with duration of the pulses and the time periods between pulses for the mode values, is given in Table 3.

TABLE 3

| Preset Mode Value | Duration of Electrical Pulse | Time between Electrical pulses |
|---|---|---|
| 2 | 1 sec | 2 sec |
| 3 | 1 | 1.5 |
| 4 | 1 | 1.0 |
| 5 | 1 | 0.75 |
| 6 | 1 | 0.5 |

In examples 1–14 below, a pizza is located 5 inches from each of the upper and lower arrays of heating elements. The time periods for cooking of the pizzas are shown in Table 4.

TABLE 4

| Ex. | Pizza | Weight of Pizza (Oz) | Controller Mode Settings For Upper and Lower Arrays of Heating Elements | Time to Complete Cooking |
|---|---|---|---|---|
| 2 | Di Giorno Rising Crust Pizza Four Cheese-Frozen | 12 | Upper Array: 3 mode Lower Array: 6 mode | 8 minutes from solid frozen to cooked |
| 3 | Freshetta Rising Crust Pizza Four Cheese-Frozen | 14 | Upper Array: 3 mode Lower Array: 6 mode | 7–8 minutes from solid frozen to cooked |
| 4 | Di Giorno Rising Crust Pizza Pepperoni-Frozen | 12 | Upper Array: 2 mode Lower Array: 5 mode | 11 minutes from solid frozen to cooked |
| 5 | Di Giorno Rising Crust Pizza Four Cheese-Frozen | 12 | Upper Array: 2 mode Lower Array: 6 mode | 10 minutes from solid frozen to cooked |
| 6 | Di Giorno Rising Crust Pizza 3 Meat-Frozen | 13.8 | Upper Array: 2 mode Lower Array: 5 mode | 10 minutes from solid frozen to cooked |
| 7 | Di Giorno Rising Crust Pizza Supreme-Frozen | 13.8 | Upper Array: 4 mode Lower Array: 6 mode | 7 minutes from solid frozen to cooked |
| 8 | Di Giorno Rising Crust Pizza Four Cheese-Frozen | 12 | Upper Array: 3 mode Lower Array: 5 mode | 11 minutes from solid frozen to cooked |
| 9 | Di Giorno Rising Crust Pizza 3 Meat-Frozen | 13.8 | Upper Array: 4 mode Lower Array: 6 mode | 8 minutes from solid frozen to cooked |
| 10 | Subway 3 frozen | 12 | Upper Array: 5 mode Lower Array: 6 mode | 7 minutes from solid frozen to cooked |
| 11 | Subway 1 frozen | 4 | Upper Array: 4 mode Lower Array: 6 mode | 4 minutes from cold to cooked |
| 12 | Subway 1 fresh | 4 | Upper Array: 3.5 mode Lower Array: 6 mode | 3.5 minutes from cold to pre-cooked |
| 13 | Subway 1 fresh | 4 | Upper Array: 3.5 mode Lower Array: 6 mode | 4 minutes from cold to pre-cooked |
| 14 | Subway 1 fresh | 4 | Upper Array: 3 mode Lower Array: 6 mode | 4.5 minutes from cold to pre-cooked |
| 15 | Subway 1 fresh | 4 | Upper Array: 3 mode Lower Array: 6 mode | 4 minutes from cold to pre-cooked |

What is claimed is:

1. An oven comprising, in combination, a Nichrome-quartz heating element that operates at 220 V to 250V and which has a power rating of 1300 W, and a controller for supplying intermittent pulses of electrical energy to the heating element to cause the heating generate infrared energy of a wavelength of about 5.3 micron to about 9.1micron.

2. The oven of claim 1 wherein the controller supplies intermittent pulses of electrical energy which have a duration of about 0.5 to 2 sec.

3. The oven of claim 2 wherein the controller supplies intermittent pulses of electrical energy at one sec. intervals.

4. The oven of claim 1 further comprising a sensor for sensing a temperature of the heating element and for forwarding that temperature to the controller.

5. The oven of claim 2 wherein the controller supplies intermittent pulses of electrical energy to the heating element to cause the heating element to operate at about 47° C. to about 271° C.

* * * * *